Jan. 28, 1941.  C. L. EASTBURG  2,230,047
TELLTALE
Filed March 4, 1938
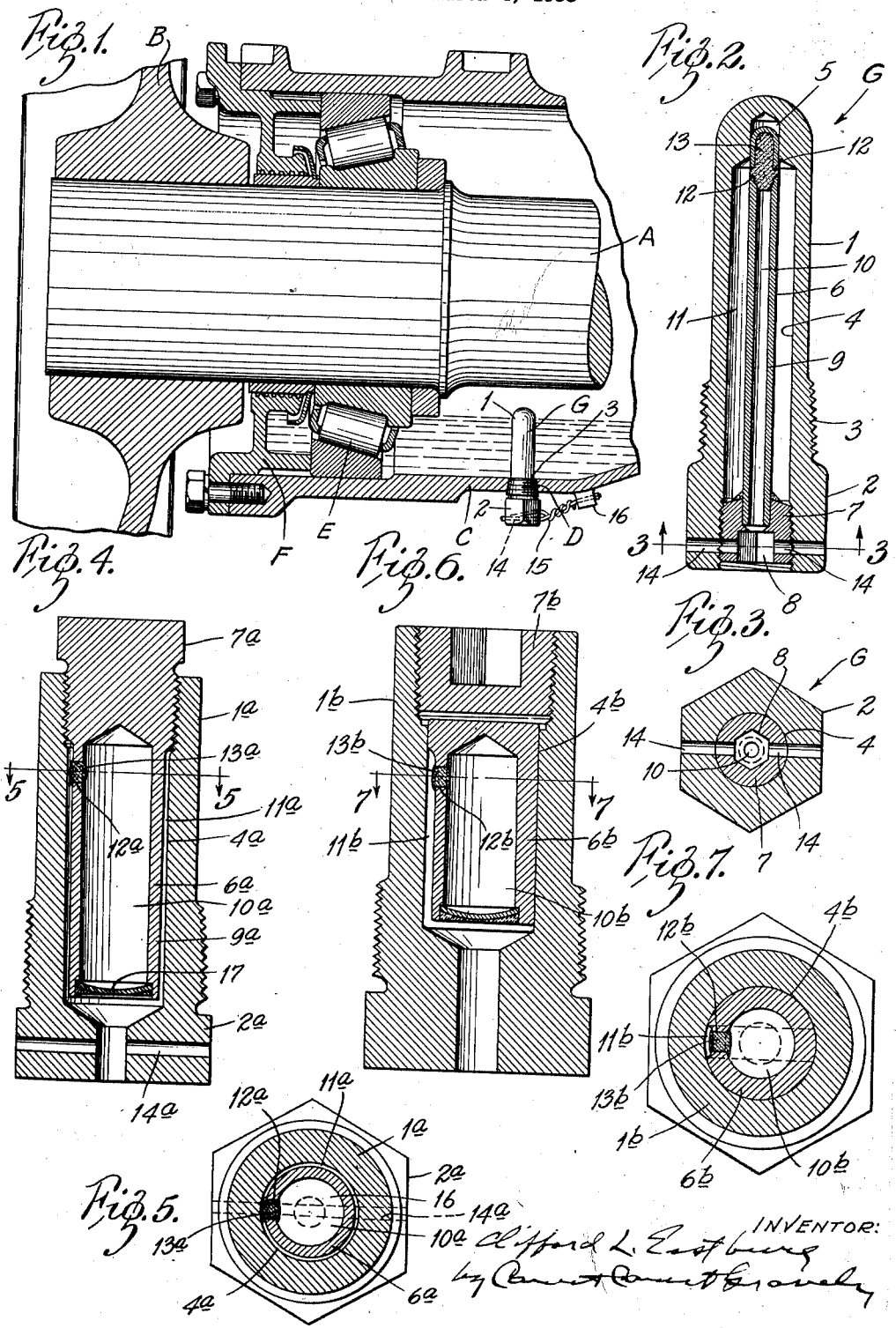
INVENTOR:
Clifford L. Eastburg
HIS ATTORNEYS.

Patented Jan. 28, 1941

2,230,047

UNITED STATES PATENT OFFICE 2,230,047

TELLTALE

Clifford L. Eastburg, Canton, Ohio, assignor to The Timken Roller Bearing Company, Canton, Ohio, a corporation of Ohio Application March 4, 1938, Serial No. 193,877

6 Claims. (Cl. 116—114)

This invention relates to thermic telltale devices for indicating excessive temperatures in various constructions. The invention has for its objects to provide for simplicity and cheapness of construction of such devices, to facilitate assembly and disassembly of the parts thereof and replacement of the signalling material, and to adapt such devices for attachment to various machines and structures without material alteration thereof.

The invention consists in the telltale and in the parts and combinations of parts hereinafter described and claimed.

In the accompanying drawing, which forms part of this specification and wherein like symbols indicate like parts in the several views, Fig. 1 is a vertical longitudinal section through the end portion of a roller bearing axle construction provided with a telltale embodying my invention;

Fig. 2 is an enlarged central longitudinal section through said telltale;

Fig. 3 is a transverse section on the line 3—3 in Fig. 2;

Fig. 4 is a central longitudinal section through a telltale of modified form;

Fig. 5 is a cross-section on the line 5—5 in Fig. 4;

Fig. 6 is a central longitudinal sectional view of another modified form of telltale; and Fig. 7 is a transverse section on the line 7—7 in Fig. 6.

In Fig. 1 of the accompanying drawing, my invention is shown in connection with a roller bearing axle construction comprising an axle A having a wheel B fixed to one end thereof, a lubricant containing housing C surrounding the axle inwardly of said wheel and having a threaded drain opening D in its bottom, a roller bearing E interposed between the axle and housing, and an end closure member F secured to the end of the housing for closing the annular space between the axle and housing. The above construction is equipped with a thermic telltale G for indicating to the sense of smell, sight, or both, an overheated condition of the roller bearing E, said device being preferably threaded into the drain opening D of the housing C and constituting a drain plug therefor and extending upwardly into the lubricant for the bearing E so that the heat generated in said bearing is transmitted to said telltale through said lubricant.

As shown in Figs. 2 and 3, the telltale G comprises a cylindrical outer member or plug 1 having at its lower end a flat-sided head 2 to facilitate turning and above said head an external thread 3 adapted to engage the threaded drain or other opening D provided therefor in the bottom of the axle housing C. This plug has an axial bore 4 which extends upwardly from the headed lower end thereof and terminates short of the upper end thereof in a portion 5 of reduced diameter. Mounted in the axial bore of the outer member 1 of the telltale is an inner member 6 comprising a head 7 which is threaded into the outer end of said bore and has a central flat-sided socket 8 in its outer end adapted to receive a socket wrench, and a hollow inwardly extending stem 9 of smaller diameter than said bore that has a closed inner end portion that seats in the reduced inner end portion 5 thereof. The tubular stem portion 9 of the inner member 6 forms a chamber or passageway 10 which is open to the atmosphere through the socket 8 in the head portion 7 of said member; and said stem also cooperates with the bore of the outer member to form an annular chamber 11 therein adapted to contain an odoriferous and/or smoke-producing liquid. The stem portion of the inner member has a plurality of radial openings 12 therein adjacent to its inner end adapted to establish communication between the chamber in the stem and the annular chamber that surrounds the same. A fusible plug 13 is mounted in the inner end of the stem 9 in position to block the openings 12 therein and thus cut off communication between the chambers 10 and 11.

The head portions 2 and 7 of the outer and inner members 1 and 6, respectively, of the telltale are provided with registering radial bores or passageways 14 adapted to receive a wire 15 which has one end anchored in a lug 16 provided therefor on the axle housing C and has its other end twisted around the portion of the wire located between said telltale and said lug. By this arrangement, the wire prevents the telltale from working loose in opening D and the inner member 6 from working loose in the outer member 1.

In the use of the device, the chamber 11 in the outer member 1 is supplied with the signaling material, and the inner member 6 with the fusible plug 13 therein is inserted into said chamber with its inner end portion seated in the reduced inner end 5 thereof and its head portion 7 threaded into the outer end thereof. The device is then threaded into the opening D in the bottom of the axle housing C where it projects upwardly through and is surrounded by the lubricant in said housing. When the bearing E becomes heated to a critical temperature due to defects or unusual conditions in the bearing assembly, said heat is transmitted from the bearing to the telltale through the oil in the bottom of the axle housing, thereby causing the fusible plug 13 to melt and thus establish communication between the chamber 10 leading to the atmosphere and the chamber 11 containing the signaling fluid. When thus exposed to a temperature high enough to melt the fusible plug, the signaling fluid will slowly vaporize and be released to the air through the hollow stem of the inner member 6 of the telltale and constitute a warning signal, which appeals to the sense of smell or sight or both, and thus indicates that the bearing requires attention.

In the modification shown in Figs. 4 and 5, the outer member 1a of the telltale is provided with an axial bore 4a that extends from end to end thereof and has a reduced outer end portion that opens into the atmosphere through the head portion 2a thereof, which is provided with a diametral bore 14a adapted to receive the locking wire. The inner member 6a is inserted in and removed from the outer member from the inner end thereof and has a head 7a located exteriorly of the inner end of the outer member, a portion that is located adjacent to said head threaded into the bore of said outer member and tubular stem portion 9a of smaller diameter than said bore that terminates short of the reduced outer end portion thereof and is closed by a welch plug 17, thereby forming a closed chamber 10a for the signaling fluid. The inner member 6a is provided with an opening 12a adapted to establish communication between the chamber therein and the annular chamber 11a formed between the inner and outer members. The opening 12a is closed by a fusible plug 13a which, when melted, establishes communication between the chambers 10a and 11a through said opening and permits the vapor to escape from the signaling material to the atmosphere.

In the modification shown in Figs. 6 and 7, a separate socket plug 7b is provided for closing the inner end of the bore 4b in the plug member 1b; and the inner member 6b has a snug fit in said bore and is provided with exterior communicating longitudinal and transverse grooves in its side and outer end that cooperate with said bore to form a chamber or passageway 11b adapted to establish communication between the chamber 10b in said inner member and the atmosphere through a hole 12b that is located in the bottom of said longitudinal groove near the upper end thereof and is normally closed by a fusible plug 13b.

The hereinbefore described telltale has several advantages. It may be readily attached to various existing structures without material alteration thereof; it may be readily removed, refilled and replaced; it is simple and economical in construction; and the parts thereof are adapted to be quickly and easily assembled merely by screwing one another.

What I claim is:

1. A telltale having inner and outer chambers therein, one adapted to contain a signalling material and the other being open to the atmosphere at one end of said telltale, and fusible means for cutting off communication between said chambers, said telltale comprising a screw plug, and a member insertable in and removable from said plug through the other end thereof and having the inner chamber formed entirely therein and cooperating with said plug to form the outer chamber, said member being connected to said plug to constitute therewith a self-contained unit.

2. A telltale comprising a screw plug having an axial bore leading from the outer end thereof and terminating short of the inner end thereof and adapted to contain a signalling material, a member having a portion threaded into said bore, a portion clear thereof and an axial bore open to the atmosphere and adapted to communicate with the axial bore of said plug, and fusible means in said member for cutting off communication between said bores.

3. A telltale comprising a screw plug having a head at its outer end and an axial bore for signalling material leading from said head and terminating short of the inner end of said plug in a portion of reduced diameter, a member having a head portion threaded into and closing the outer end of said bore and having a socket in its outer end and a tubular portion of smaller diameter than said bore with its inner end fitting the reduced inner end portion thereof, said tubular portion opening into said socket at its outer end and having an opening adjacent to its inner end opening into said bore, and a fusible plug filling the inner end of said tubular portion and closing said opening.

4. A telltale comprising a screw plug having an axial bore extending therethrough from end to end thereof, a member threaded into one end of said bore and having a chamber portion disposed in but spaced from said bore and adapted to contain a signalling material, said chamber portion of said member having an opening extending through the side wall thereof adapted to establish communication between said bore and the chamber in said member, and fusible means in said opening for cutting off communication between said bore and said chamber.

5. A thermic telltale having inner and outer chambers therein, one adapted to contain a signalling material and the other being open to the atmosphere through the outer end of said telltale, and fusible means for cutting off communication between said chambers, said telltale comprising an outer member and an inner member insertable in and removable from said outer member through one end thereof, said inner member having the inner chamber formed entirely therein and cooperating with said outer member to form said outer chamber, said inner and outer members being connected together to constitute a self-contained unit.

6. A thermic telltale having two chambers therein, one adapted to contain a signalling material and the other being open to the atmosphere through the outer end of said telltale, and fusible means for cutting off communication between said chambers, said telltale comprising an externally threaded outer member and an inner member insertable in and removable from said outer member through the outer end thereof, said inner member having one of said chambers formed entirely therein and cooperating with said outer member to form the other chamber, said inner member being threaded into said outer member to constitute therewith a complete self-contained unit.

CLIFFORD L. EASTBURG.